(12) United States Patent
Magnusson et al.

(10) Patent No.: US 8,938,525 B2
(45) Date of Patent: Jan. 20, 2015

(54) ACCESS NODE SELECTION IN A NETWORK

(75) Inventors: Per Magnusson, Linköping (SE); Johan Lundsjö, Spånga (SE); Mikael Prytz, Rönninge (SE); Joachim Sachs, Aachen (DE)

(73) Assignee: Optis Cellular Technology, LLC, Plano, TX (US)

( * ) Notice: Subject to any disclaimer, the term of this patent is extended or adjusted under 35 U.S.C. 154(b) by 1625 days.

(21) Appl. No.: 12/064,965

(22) PCT Filed: Dec. 30, 2005

(86) PCT No.: PCT/SE2005/002062
§ 371 (c)(1),
(2), (4) Date: Mar. 31, 2008

(87) PCT Pub. No.: WO2007/027129
PCT Pub. Date: Mar. 8, 2007

(65) Prior Publication Data
US 2008/0250142 A1    Oct. 9, 2008

(30) Foreign Application Priority Data

Aug. 29, 2005 (WO) .................. PCT/IB2005/052818

(51) Int. Cl.
*G06F 15/173* (2006.01)
*H04W 72/00* (2009.01)
*H04W 48/20* (2009.01)
(Continued)

(52) U.S. Cl.
CPC .............. *H04W 48/20* (2013.01); *H04W 88/06* (2013.01); *H04W 48/18* (2013.01); *H04W 88/10* (2013.01)

USPC ........................................ 709/223; 455/452.2

(58) Field of Classification Search
USPC ................ 709/225; 370/238, 338; 455/426.1, 455/552.1, 436, 456.3, 435; 713/171
See application file for complete search history.

(56) References Cited

U.S. PATENT DOCUMENTS 5,412,375 A * 5/1995 Wood ............................ 455/451
6,591,103 B1 * 7/2003 Dunn et al. .................... 455/436
(Continued)

FOREIGN PATENT DOCUMENTS

CA    2411954 A1    5/2003
EP    1531645       5/2005
(Continued)

OTHER PUBLICATIONS

Search Report ROC (Taiwan) Patent Application No. 095122141 issued on Jul. 24, 2012.

*Primary Examiner* — Brian P Whipple
*Assistant Examiner* — Michael A Chambers
(74) *Attorney, Agent, or Firm* — Vincent J. Allen; James H. Ortega; Carstens & Cahoon, LLP

(57) ABSTRACT

The invention is directed towards determining an access node (14, 16) for a terminal (18) in a network (10) having one or more access nodes capable of providing access to the terminal based on one or more access technologies. Access node is selected through determining whether at least one network parameter provided by a network node (12, 14, 16) is required as input for the access node selection for the terminal. If it is determined that the at least one network parameter is required as input, the network parameter is obtained and an access node possibly together with access type for the terminal is selected at least based on said network parameter.

42 Claims, 6 Drawing Sheets

(51) Int. Cl.
*H04W 88/06* (2009.01)
*H04W 48/18* (2009.01)
*H04W 88/10* (2009.01)

(56) References Cited

U.S. PATENT DOCUMENTS

| | | |
|---|---|---|
| 6,608,832 B2 * | 8/2003 | Forslow .................... 370/353 |
| 6,636,502 B1 * | 10/2003 | Lager et al. ................ 370/352 |
| 6,836,644 B2 * | 12/2004 | Bacon et al. ............... 455/74.1 |
| 6,845,091 B2 * | 1/2005 | Ogier et al. ................ 370/338 |
| 7,016,317 B1 * | 3/2006 | Pathak et al. .............. 370/329 |
| 7,142,860 B2 * | 11/2006 | Mildh et al. ............... 455/443 |
| 7,174,170 B2 * | 2/2007 | Steer et al. ................. 455/446 |
| 7,209,734 B2 * | 4/2007 | Maes ........................ 455/414.1 |
| 7,212,810 B2 * | 5/2007 | Babbar et al. ............. 455/414.1 |
| 7,286,474 B2 * | 10/2007 | Garg et al. ................. 370/230 |
| 7,324,465 B2 * | 1/2008 | Lim et al. .................. 370/278 |
| 7,353,028 B2 * | 4/2008 | Fukuhara .................. 455/436 |
| 7,362,731 B2 * | 4/2008 | Vinayakray-Jani ........ 370/331 |
| 7,376,104 B2 * | 5/2008 | Diachina et al. .......... 370/332 |
| 7,433,707 B2 * | 10/2008 | Kaminski et al. ......... 455/552.1 |
| 7,451,316 B2 * | 11/2008 | Halasz et al. ............. 713/171 |
| 8,073,920 B2 * | 12/2011 | Gailey et al. .............. 709/207 |
| 8,126,477 B2 * | 2/2012 | Dravida et al. ........... 455/456.3 |
| 8,159,985 B2 * | 4/2012 | Karaoguz et al. ......... 370/312 |
| 2002/0068574 A1 * | 6/2002 | Vestergaard et al. ..... 455/445 |
| 2002/0069284 A1 * | 6/2002 | Slemmer et al. ......... 709/227 |
| 2002/0087674 A1 * | 7/2002 | Guilford et al. .......... 709/223 |
| 2002/0102977 A1 * | 8/2002 | Shi ............................ 455/437 |
| 2002/0102987 A1 * | 8/2002 | Souisse et al. ............ 455/454 |
| 2002/0123314 A1 * | 9/2002 | Kitazawa et al. ......... 455/134 |
| 2002/0161867 A1 * | 10/2002 | Cochran et al. .......... 709/221 |
| 2003/0045302 A1 * | 3/2003 | Oda et al. .................. 455/456 |
| 2003/0186695 A1 * | 10/2003 | Bridges et al. ............ 455/432 |
| 2003/0236074 A1 * | 12/2003 | Ishii et al. ................. 455/69 |
| 2004/0116153 A1 * | 6/2004 | Kaminski et al. ......... 455/552.1 |
| 2004/0136324 A1 * | 7/2004 | Steinberg et al. ......... 370/238 |
| 2004/0136392 A1 * | 7/2004 | Diachina et al. .......... 370/431 |
| 2004/0153525 A1 * | 8/2004 | Borella ...................... 709/217 |
| 2004/0203736 A1 * | 10/2004 | Serna ......................... 455/426.1 |
| 2004/0203893 A1 * | 10/2004 | Kotzin ....................... 455/456.1 |
| 2004/0208144 A1 * | 10/2004 | Vinayakray-Jani ........ 370/331 |
| 2005/0047385 A1 * | 3/2005 | Otsuka ....................... 370/338 |
| 2005/0070280 A1 * | 3/2005 | Jung et al. ................. 455/434 |
| 2005/0083899 A1 * | 4/2005 | Babbar et al. ............. 370/342 |
| 2006/0013398 A1 * | 1/2006 | Halasz et al. ............. 380/273 |
| 2006/0045033 A1 * | 3/2006 | Fukuhara .................. 370/310 |
| 2006/0059261 A1 * | 3/2006 | Finkenzeller et al. .... 709/225 |
| 2006/0239229 A1 * | 10/2006 | Marinescu et al. ........ 370/331 |
| 2006/0258356 A1 * | 11/2006 | Maxwell et al. .......... 455/436 |
| 2007/0201425 A1 * | 8/2007 | Smith et al. ............... 370/351 |

FOREIGN PATENT DOCUMENTS

| | | |
|---|---|---|
| TW | 200509628 A | 3/2005 |
| WO | 0201892 A2 | 1/2002 |
| WO | 03069940 A | 8/2003 |
| WO | 2005060294 A1 | 6/2005 |
| WO | 2005/062652 | 7/2005 |

* cited by examiner

ACCESS NODE SELECTION IN A NETWORK

TECHNICAL FIELD OF THE INVENTION

The present invention relates to the field of access node selection in telecommunication networks. The invention more particularly relates to a method, a communication device, a network node as well as computer program products related to handling access selection for a terminal communicating with a network.

DESCRIPTION OF RELATED ART

In networks and typically then cellular networks there have evolved many different communication standards, such as GSM, UMTS and WLAN. There is furthermore a growing interest of providing networks that simultaneously provide different communication standards. The network may then also provide different standards in the same geographical area. There is furthermore a trend for allowing mobile terminals to be able to use several such standards, which means a terminal may communicate with a network via several different access nodes (normally provided through base stations) having several different communication standards.

When a terminal is then communicating with the network, there has to be a selection of which access node to connect to as well as possibly which standard and/or which channel within a certain standard that is to be used.

The normal procedure is then that the network decides the node access is to be provided through. However this places a burden on the network. In many cases the choice of what node is to be selected for access is a relatively simple one and it would therefore be advantageous from an efficiency point of view to distribute this selection as much as possible.

It is also possible that the terminal decides on the access node. However in some cases this can be difficult to make, especially if special network parameters like cell load have to be considered. This is sometimes not possible to determine in a terminal. Even if the terminal could determine such a network parameter, the determination of it would require quite heavy processing, which it is not advantageous to perform in a terminal from an energy consumption point of view, since terminals are often battery powered.

There is therefore a need for an improved access node selection which relieves the network from much of the decision making while at the same time avoiding burdening the terminal with excessive processing.

SUMMARY OF THE INVENTION

The present invention is therefore directed towards solving the problem of providing improved access node selection and then especially directed towards access node selection which relieves the network from much of the decision making while at the same time avoiding burdening the terminal with excessive processing.

This is generally solved through determining whether at least one network parameter provided by a network node is required as input for an access selection for a terminal, and if it is determined that the at least one network parameter is required as input, obtaining said network parameter and selecting an access node possibly together with access type for the terminal at least based on said network parameter.

One object of the present invention is thus directed towards providing a method for selecting access for a terminal communicating with a network having one or more access nodes capable of providing access to the terminal based on one or more access technologies.

This object is according to a first aspect of the present invention achieved through a method for selecting access for a terminal communicating with a network having one or more access nodes capable of providing access to the terminal based on one or more access technologies, comprising:
performing, in dependence of a determination having been made of whether at least one network parameter provided by a network node is required as input for the access selection for the terminal, the steps of
  obtaining said network parameter, and
  selecting an access node possibly together with access type for the terminal at least based on said network parameter, each time such a determination is being made.

Another object of the present invention is directed towards providing a communication device, which selects access for a terminal communicating with a network having one or more access nodes capable of providing access to the terminal based on one or more access technologies.

This object is according to the first aspect of the present invention also achieved through a communication device for handling access selection for a terminal communicating with a network having one or more access nodes capable of providing access to the terminal based on one or more access technologies, comprising:
a resource management unit arranged to
  perform, in dependence of a determination having been made of whether at least one network parameter provided by a network node is required as input for the access selection for the terminal, each time such a determination is being made,
  obtaining of said network parameter, and
  selecting an access node possibly together with access type for the terminal at least based on said network parameter.

Another object of the present invention is directed towards providing a computer program product, which selects access for a terminal communicating with a network having one or more access nodes capable of providing access to the terminal based on one or more access technologies.

This object is according to the first aspect of the present invention also achieved through a computer program product for access selection for a terminal communicating with a network having one or more access nodes capable of providing access to the terminal based on one or more access technologies, comprising computer program code to make a communication device, when said code is loaded into the communication device:
  perform, in dependence of a determination having been made of whether at least one network parameter provided by a network node is required as input for the access selection for the terminal,
  obtaining said network parameter, and
  selecting an access node possibly together with access type for the terminal at least based on said network parameter, each time such a determination has been made.

Yet another object of the present invention is to provide a method of aiding selection of access for a terminal communicating with a network having one or more access nodes capable of providing access to the terminal based on one or more access technologies.

This object is according to the first aspect of the present invention achieved by a method of aiding selection of access for a terminal communicating with a network having one or more access nodes capable of providing access to the terminal based on one or more access technologies, comprising:
    determining whether at least one network parameter provided by a network node is required as input for the access selection for the terminal, for allowing the obtaining of said network parameter, and
    ordering selection of an access node possibly together with access type for the terminal at least based on said network parameter, each time such a determination has been made.

Another object of the present invention is directed towards providing a communication device, which aids in the selection of access for a terminal communicating with a network having one or more access nodes capable of providing access to the terminal based on one or more access technologies.

This object is according to the first aspect of the present invention also achieved through a communication device for aiding access selection for a terminal communicating with a network having one or more access nodes capable of providing access to the terminal based on one or more access technologies, comprising
    a resource management unit arranged to:
        determine whether at least one network parameter provided by a network node is required as input for the access selection for the terminal, for allowing the obtaining of said network parameter, and
        order the selection of an access node possibly together with access type for the terminal at least based on said network parameter, each time such a determination has been made.

Yet another object of the present invention is directed towards providing a computer program product, which aids in the selection of access for a terminal communicating with a network having one or more access nodes capable of providing access to the terminal based on one or more access technologies.

This object is according to the first aspect of the present invention also achieved through a computer program product for aiding access selection for a terminal communicating with a network having one or more access nodes capable of providing access to the terminal based on one or more access technologies, comprising computer program code to make a communication device, when said code is loaded into the communication device:
    determine whether at least one network parameter provided by a network node is required as input for the access selection for the terminal, for allowing the obtaining of said network parameter, and
    order the selection of an access node possibly together with access type for the terminal at least based on said network parameter, each time such a determination has been made.

Still another object of the present invention is directed towards providing a network node, which provides selection of a control location alternative for selection of an access node.

This object is according to a second aspect of the present invention achieved through a network node in a network having one or more access nodes capable of providing access to terminals based on one or more access technologies, said network further comprising a number of control location alternatives where access selection for a terminal communicating with the network may be performed through determining whether at least one network parameter provided by a network node is required as input for an access selection for a terminal and at least once obtain said network parameter and select an access node, possibly together with access type, for the terminal at least based on said network parameter if it is determined that the at least one network parameter is required as input,
    said network node comprising a resource management unit arranged to select a control location alternative through for each control location alternative in the set of available control location alternatives, evaluate an efficiency of that control location alternative, and
    select the control location alternative for the access selection for the terminal from the set of available control location alternatives based at least in part on the evaluated efficiencies.

Another object of the present invention is directed towards providing a computer program, product, which provides selection of a control location alternative for selection of an access node.

This object is according to the second aspect of the present invention also achieved through a computer program product for a network node in a network having one or more access nodes capable of providing access to terminals based on one or more access technologies,
said network further comprising a number of control location alternatives where access selection for a terminal communicating with the network may be performed through determining whether at least one network parameter provided by a network node is required as input for an access selection for a terminal and at least once obtain said network parameter and select an access node, possibly together with access type, for the terminal at least based on said network parameter if it is determined that the at least one network parameter is required as input,
said computer program product comprising computer program code to make said network node perform, when said code is loaded into the network node,
    select a control location alternative through for each control location alternative in the set of available control location alternatives,
    evaluate an efficiency of that control location alternative, and
    select the control location alternative for the access selection for the terminal from the set of available control location alternatives based at least in part on the evaluated efficiencies.

The present invention has many advantages. The first aspect of the present invention allows reduction of the processing power in the network associated with selecting an access node for a terminal. As such a selection for most terminals is straightforward, this reduction is significant. The access can for most terminals therefore also be faster. As a result the signalling in the network is reduced as is the delays involved with signalling, which also reduces the power consumption of the terminals as well as allows the network to concentrate on the cases where more factors are to be considered when determining the access node and access type. The invention may therefore also increase the quality of service for the end terminal as well as increase the performance of the network. The second aspect of the present invention has the advantage of lowering signalling and delays within the network, as the most optimal node of the network is selected to perform access node selection. This thus even further enhances the performance of the network.

The expression network condition is intended to mean a condition related to a network that can be measured or predicted by a mobile terminal.

The expression access type is here intended to cover a type of access technology and/or a type of channel within a standard.

It should be emphasized that the term "comprises/comprising" when used in this specification is taken to specify the presence of stated features, integers, steps or components, but does not preclude the presence or addition of one or more other features, integers, steps, components or groups thereof.

BRIEF DESCRIPTION OF THE DRAWINGS

The present invention will now be described in more detail in relation to the enclosed drawings, in which.

DETAILED DESCRIPTION OF EMBODIMENTS

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. In other instances, detailed descriptions of well known devices, circuits, and methods are omitted so as not to obscure the description of the present invention with unnecessary detail.

Figure 1:
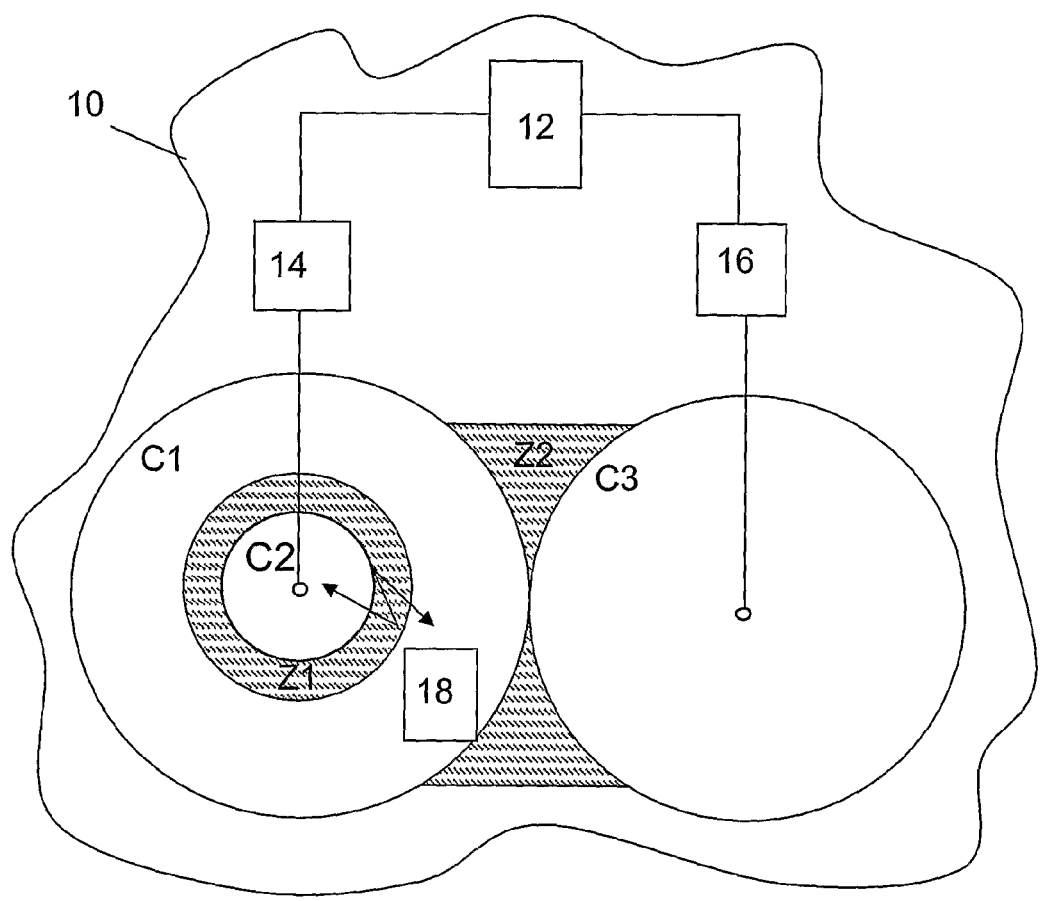
FIG. 1 schematically shows a mobile station communicating with a simplified network according to a first aspect of the present invention having three network nodes and three cells.

FIG. 1 schematically shows a network 10 according to a first variation of the present invention. The network 10 includes a number of communication devices in the form of a first 12, a second 14 and a third network node 16. The first node 12 is here a radio resource management server, which may be provided in a radio network controller (RNC), while the second and third node 14 and 16 may be base stations providing a radio access node each. The second node 14 here provides access for two different communication technologies, where a first may be UMTS (Universal Mobile Telecommunications) and the second may be WLAN (Wireless Local Area Network). Therefore the second node 14 provides two overlapping cells C1 and C2 where a first cell C1 covers a wider area than a second cell C2. The third node 16 is here providing communication in a third cell C3 according to one technology or standard only, which is here UMTS as in the first cell C1. Another communication device in the form of a terminal 18 is communicating with the second node 14. There is furthermore a first zone Z1 where the performances in radio link between the first and second cells C1 and C2 are comparable as well as a second zone Z2 where the performances in radio link between the first and third cells C1 and C3 are comparable. In these zones Z1 and Z2 network parameters are required for selection of access node and possibly also of communication technology. This is important for a first aspect of the present invention. The importance of these zones Z1 and Z2 will be described in more detail shortly. It should here be realized that also the third cell C3 could overlap a cell of another communication technology. It should furthermore be realized that the network in FIG. 1 is simplified in that it could in reality include several more nodes and terminals. It should also be realized that the performance in radio link, for instance expressed as signal-to-interference-plus-noise ratio (SINR), i.e. the radio characteristics of radio links, is just one example of a criterion that can be used for determining that network parameters need to be considered when selecting access node. There are several other criteria that can be used instead, where some examples will be given later.

The terminal 18 is here a mobile station, which may be a cellular phone, a laptop computer, a palm top computer or any other device having wireless communication capabilities according to one or more communication technologies.

Figure 2:
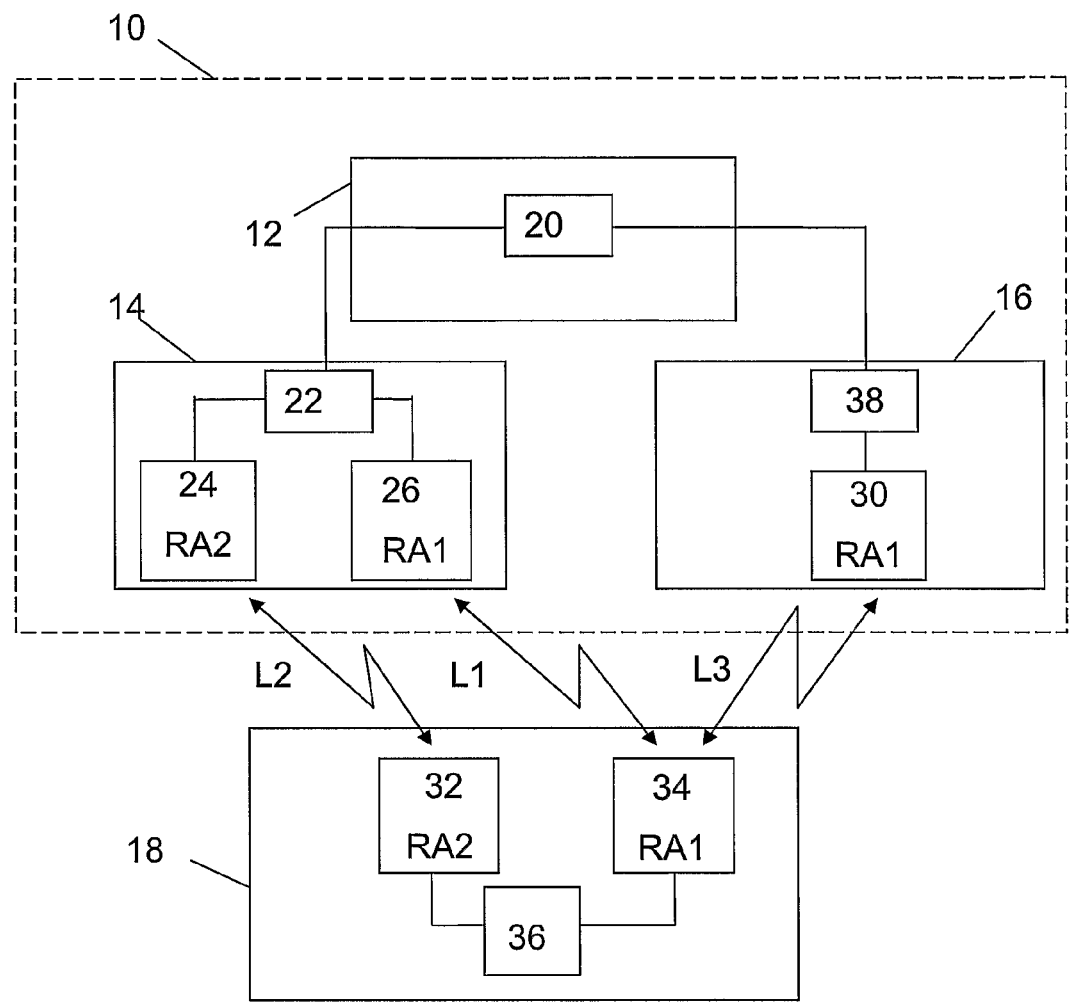
FIG. 2 shows a block schematic of relevant units of the network nodes and the mobile station of the first aspect.

FIG. 2 shows a block schematic of the different nodes 12, 14, 16 in the network 10 and of the terminal 18. The first node 12 here includes a central radio resource management unit 20 which communicates with a first local resource management unit 22 in the second node 14 and with a second local resource management unit 38 in the third node 16. In the second node 14 a first network radio interface 26 providing radio access communication according to the first communication technology RA1 (here UMTS) and a second network radio interface 24 providing radio access according to the second communication technology RA2 (here WLAN) are connected to the first local radio resource management unit 22. In the third node 16, a third radio interface 30 providing radio access RA1 according to the first communication technology (here UMTS) is connected to the second local radio resource management unit 38. The terminal 18 includes a terminal radio resource management unit 36 being connected to a first terminal interface 34 providing radio communication according to the first communication technology RA1 and a second terminal interface unit 32 providing communication according to the second radio communication technology RA2. The first radio interface 26 provides the cell C1, the second radio interface 24 provides the cell C2, while the third radio interface 30 provides the cell C3 shown in FIG. 1. As can be seen from the figure the first terminal interface 34 communicates with the first network interface 26 of the second node 14 via a first link L1. The second terminal interface 32 communicates with the second network interface unit 24 of the second node 14 via a second link L2. Finally there is a third link L3 between the third network interface 30 of the third node 16 and the first terminal interface 34.

Figure 3:
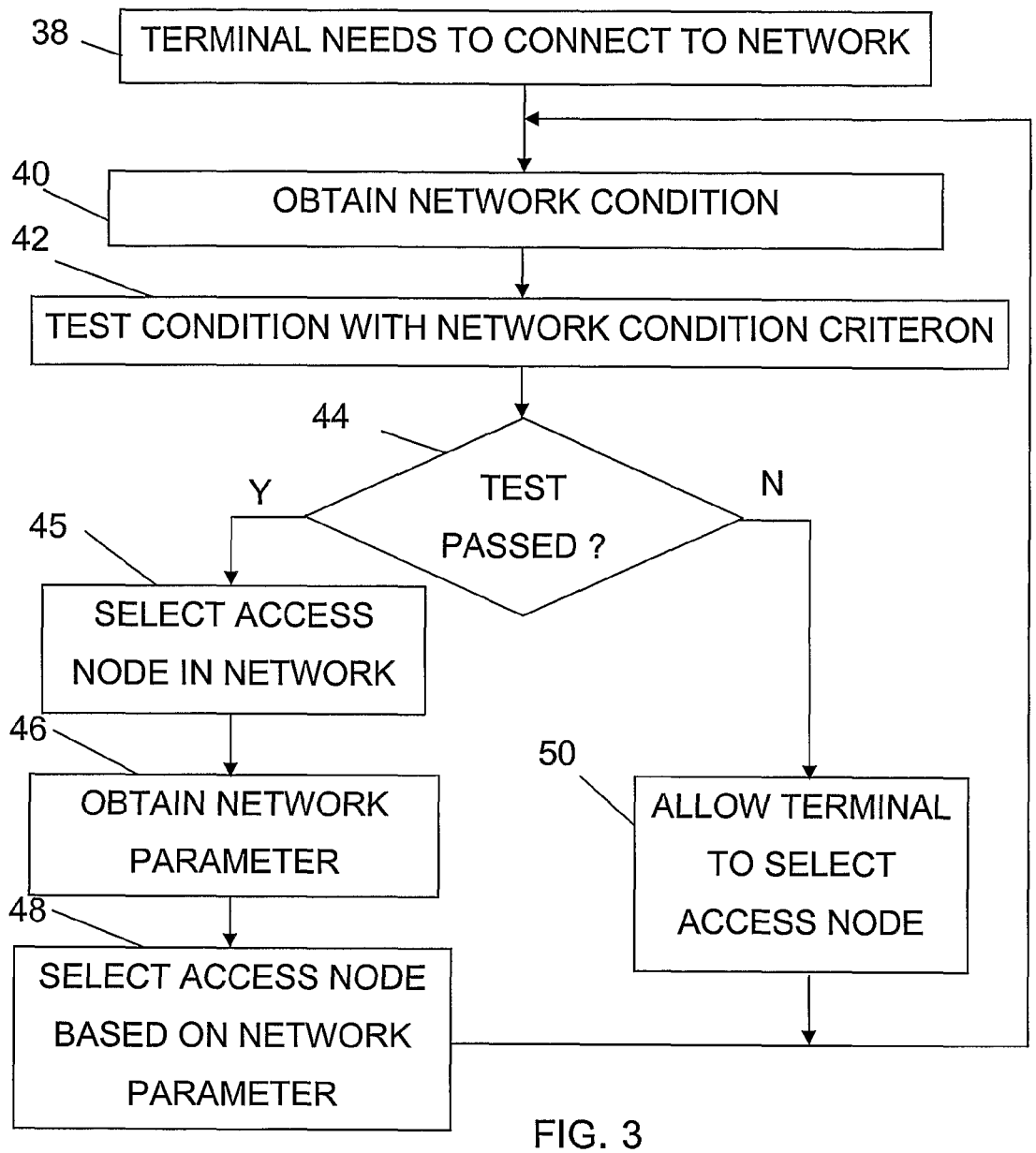
FIG. 3 shows a flow chart outlining a method according to the first aspect.

A first aspect of the present invention will now be described with reference being made to FIGS. 1-3, where the latter shows a flow chart of a number of method steps performed in the network.

According to the first aspect of the present invention, the terminal 18 is allowed to select an access node to the network by itself, except in special situations. This means that the network 10 is relieved of the burden to select an access node for the terminal 18. This has a major advantage in that the amount of signalling needed between the terminal 18 and the network 10 as well as between different network nodes is reduced significantly. The delay caused by the signalling is also reduced. This furthermore relieves processing power in the first network node 12.

The method starts with the terminal 18 needing to connect to the network 10, step 38. In order to be able to decide on an access node, the terminal 18 may look at a number of different network conditions. A network condition is a condition that can be measured or predicted by the terminal 18 itself. One that might be used here in order to explain the present invention is the link qualities between the terminal 18 and the different network interfaces of the network 10. The link qualities may here typically be signal to interference ratio and bit error rate, peak bit rate, delay etc. These are just examples of network conditions that can be used according to the present invention. A number of further different network condition examples will be given later. It should furthermore be noted that the terminal 18 may look at only one network condition. It may also look at several network conditions. Here there is, in order to better explain the invention, only one network condition that is used, and that is the network condition of signal to interference ratio SIR. For the terminal 18 there exists a candidate set of radio links to a number of access nodes, which set in FIG. 1 are the first, second and third links L1, L2 and L3. As the terminal 18 thus needs to connect to the network 10, the terminal interfaces 32 and 34 measure the different SIRs of the links L1, L2 and L3 to the network interfaces. These measurements are then forwarded to the terminal radio resource management unit 36. In this way the terminal radio resource management unit 36 obtains the network condition, step 40. It then tests this network condition with a network condition criterion, step 42. In the present example the network condition criterion is if the differences in quality between the radio links L1, L2, L3 in the set are smaller than a certain radio link difference threshold. If that is the case, the test is passed, step 44. If the test is not passed, step 44, i.e. if the differences are above the threshold, the terminal 18 may itself select an access node and network interface, step 50, while if the test is passed, step 44, access selection can be based on one or more network parameters provided by the network. In this case the terminal radio resource management unit 36 signals to the network 10 that it cannot select an access node or requests an access node selection which may be signalled to either the second 14, the third 16 or both the second and the third access nodes using one or both of the terminal interfaces. This information is then forwarded from a network interface to the corresponding local radio resource management unit 22 and/or 38, which then forwards the information to the central radio resource management unit 20 of the first node 12. Here the different SIR measurements may also be provided by the terminal 18 and forwarded to the central resource management unit 20. The central resource management unit 20 then decides to perform selection of access node, step 45 and obtains a network parameter for aiding in the selection, step 46, which network parameter is here the network parameter cell load. The central resource management unit 20 may then collect the cell load information of the different cells from the local resource management units 22 and 38 of the access nodes 14 and 16. It may also have that information stored beforehand, in that the local resource management units 22 and 38 may continuously report cell load to the central resource management unit 20. The cell load information may also be provided by the second and third nodes 14 and 16 when the terminal signals that it cannot select an access node. The central resource management unit 20 then selects an access node, step 48, i.e. 14 or 16 and also network interface, 24, 26 or 30, based on all this information. The selected access node is informed, and possibly also the node not selected. Thereafter the selected node informs the terminal, and access is made to the terminal via the selected node and network interface. When this has been done the terminal 18 yet again obtains network conditions, step 40, and performs the test, step 44, so that the access selection may be changed as the terminal moves in the network.

In order to exemplify what may happen, reference is yet again made to FIG. 1. Consider the terminal 18 shown there. Initially the terminal 18 may be located in the area covered by cell C1 outside of cell C2. This means that here the SIR of C1 is much stronger than the SIRs of cell C2 and C3. Thus here the link L1 has a far better quality than the links L2 and L3, i.e. the difference in link quality is higher than the threshold. Thus the terminal 18 here selects the node and network interface by itself and then selects the node and network interface for link L1. Now, suppose the terminal 18 moves inwards towards the center of cell C1, it will then enter the first zone Z1, where the SIR value difference of the first and second cells C1 and C2 are smaller than the threshold mentioned above. The terminal 18 would then request that the network 10 decides on an access node and access technology. The network 10, i.e. the central radio resource management unit 20, may then select either of the first and second network interfaces 24 and 26 and then also consider the network load in the selection. It might then select the interface associated with the cell out of cell C1 and C2 having the lowest load. Now suppose that the terminal 18 moves further inwards towards the center of the first and second cells C1 and C2 and thus leaves the zone Z1. It may now have a far better link quality for the link L2 to the cell C2 than for link L1 and L3, so that now again the terminal 18 is allowed to select the access node. The same principle applies if the terminal 18 were to move towards the third cell C3 instead. Here it would eventually move into the second zone Z2 where the difference between the link qualities of links L1 and L3 of the first and third cells C1 and C3 are below said threshold. The network 10 would then again be asked to perform access node selection by considering the network parameter. If the terminal on the other hand would move either into the second cell C2 or back into the first cell C1, the terminal is again allowed to select the access node by itself. Thus the terminal 18 continuously determines if it can select the access node by itself or if the network 10 is to select an access node.

In the example given above, the different access nodes can be for the same radio access technology. It is also possible that a single node can provide multiple accesses via the same radio access technology, for instance through using different channels and/or frequency bands. Thus a node and access type is selected above, where an access type may be a type of radio access technology, but it may also be a type of channel or a frequency band. It should furthermore be realized that the terminal can communicate with the network via multiple interfaces at the same time and an access selection may affect only one of them.

There are several further modifications that can be made of this first aspect of the present invention. It should first be realized that the criterion used need not be fixed. It can be adaptively set by the network, for instance in dependence of network load as well as set different for different areas of a network or even different areas of cell. The zones mentioned above may therefore be expanded or diminished. The criterion may also be set differently for each terminal the network is communicating with.

It is furthermore possible to consider several more network conditions, either instead of link quality or in addition to link quality. It is for instance possible to consider if the load in some cells is below a certain load threshold, if the number of links in the set of links is above a certain threshold, if the number of users (terminals) in a certain area is larger than a certain user threshold, if the number of links that are significantly better than other links is smaller than a certain link threshold, if the number of links that fit well to a certain service requirement is smaller than a best matching threshold, as well as a number of links that have a policy for being preferred radio links is smaller than a preferred link number threshold.

The different method steps may furthermore be performed in one of the second and third nodes of the network instead of in the first node. It is furthermore possible that the terminal after the test having been passed receives the network parameters from the network and performs the selection of access node based on this network parameter. It is furthermore possible that the terminal sends network condition information to the network and that one node tests the condition and then informs the terminal that the test was passed and that the network therefore will decide what access node and possibly what communication technology is to be used.

As mentioned above there are several nodes that may decide which access node to use. Now a second aspect of the present invention will be described, which is directed towards selecting which network node is to determine the access node and access type when applicable. In this second aspect, the terminal may be allowed to select an access node when the network conditions are not met as in the first aspect. It is here also possible that the network will always decide on the access node.

Figure 4:
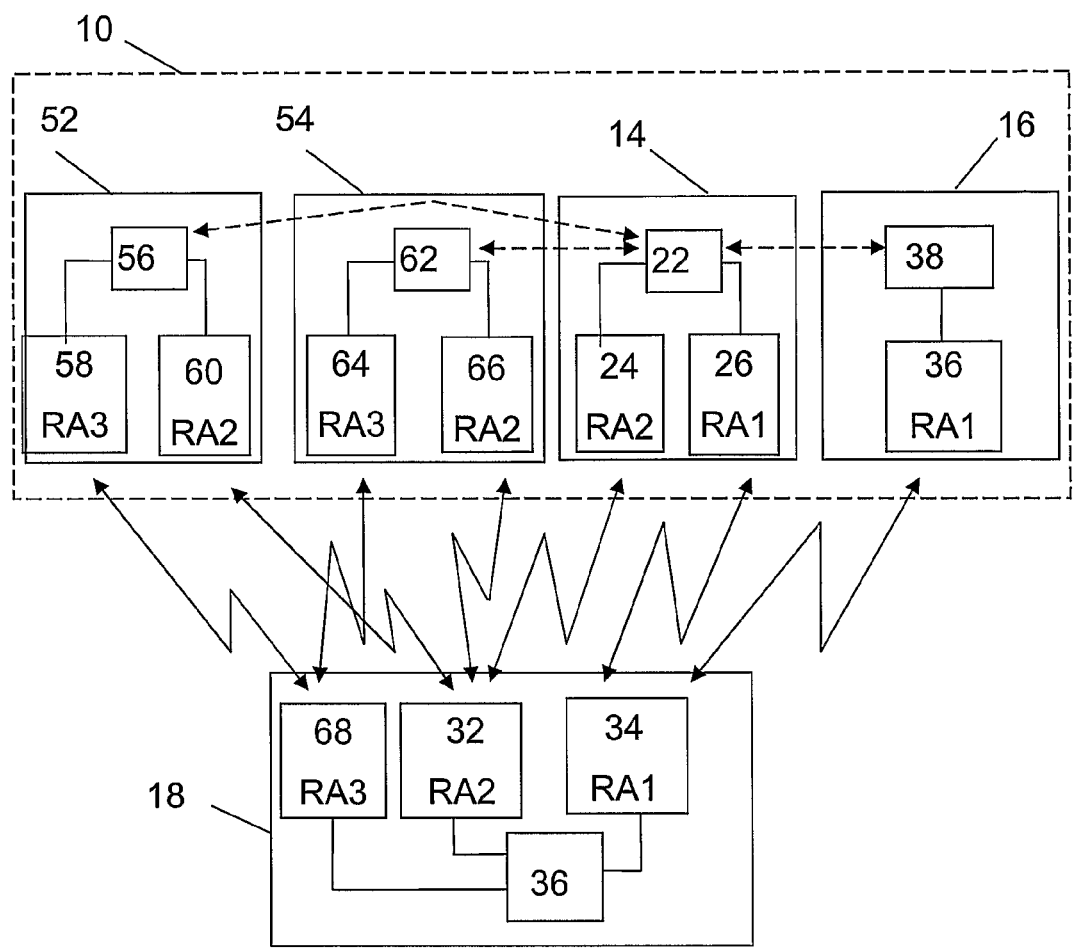
FIG. 4 shows a block schematic of units in nodes and the mobile station in a network according to a second aspect of the present invention.
Figure 5:
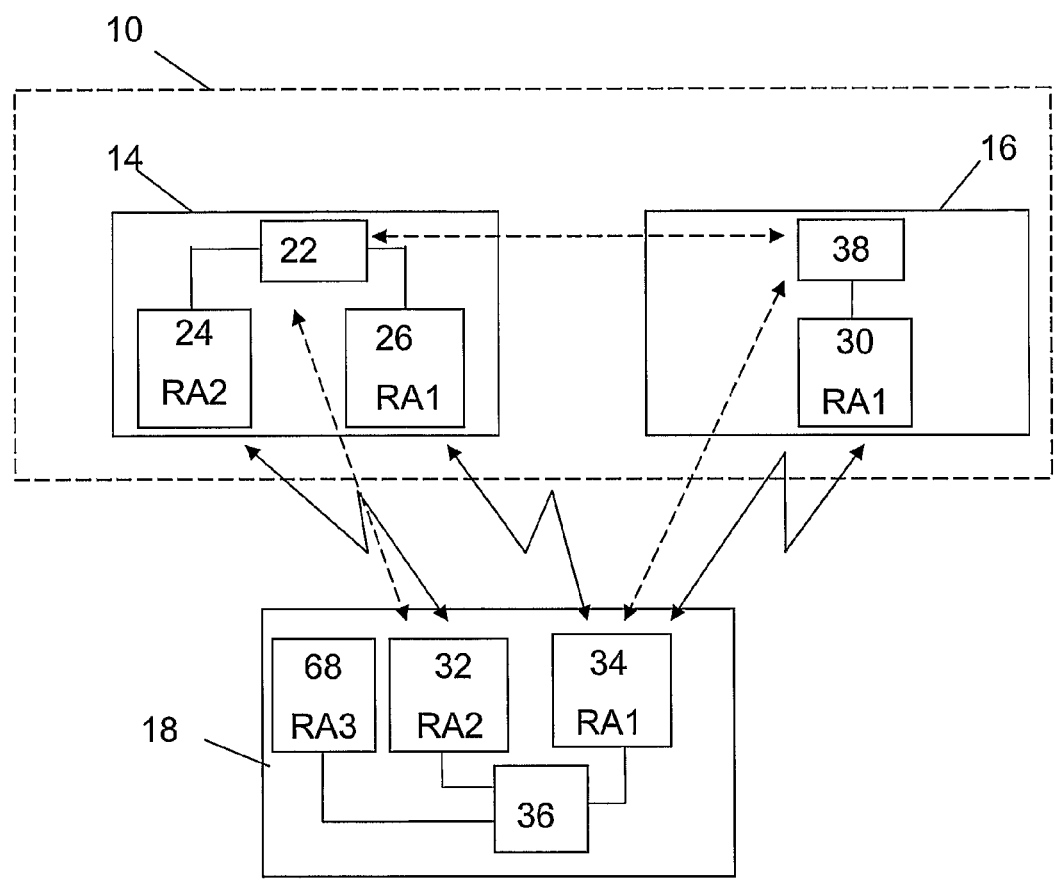
FIG. 5, shows a block schematic of units in nodes and the mobile station in a network according to a variation of the second aspect of the present invention.
Figure 6:
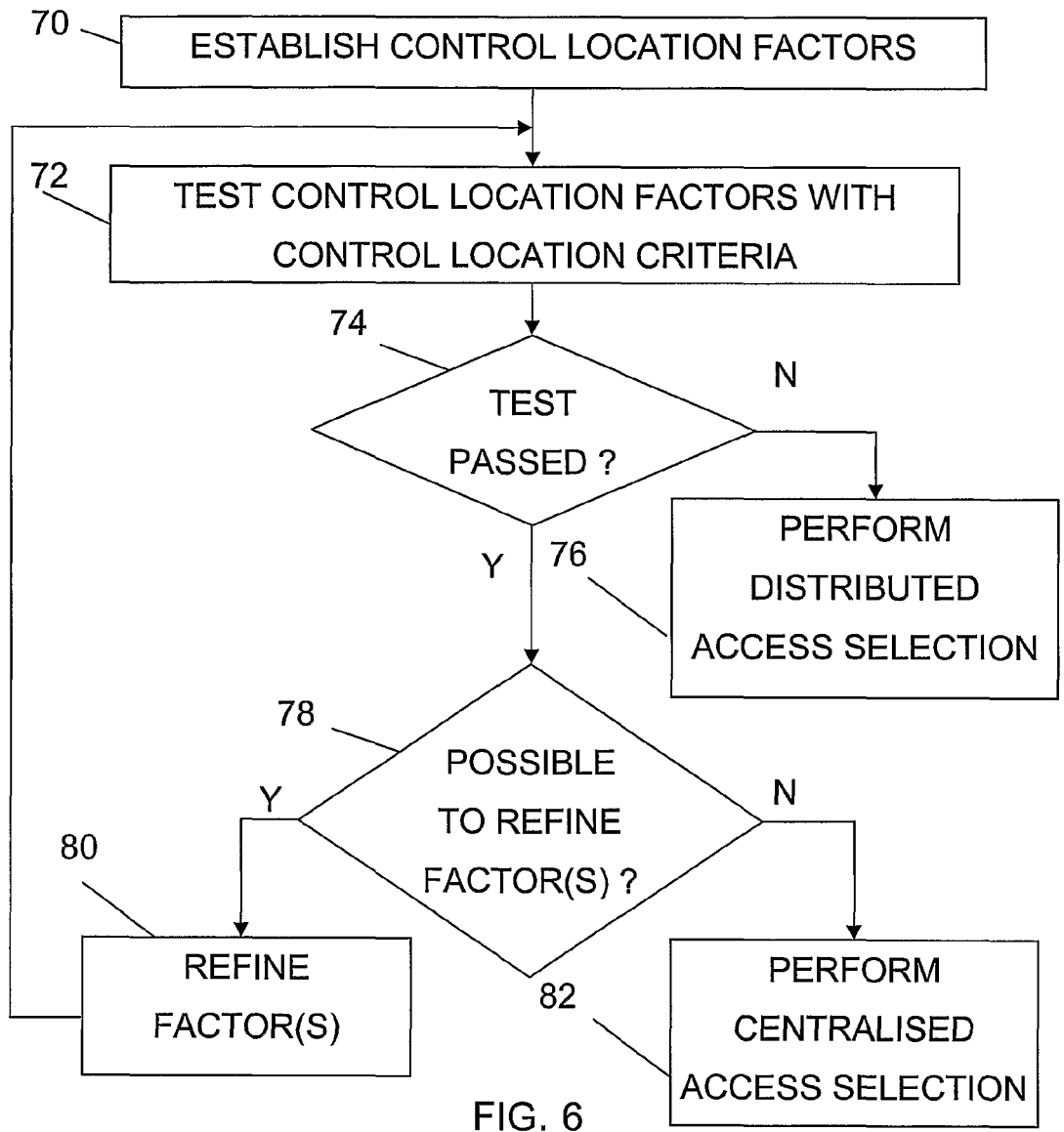
FIG. 6, shows a flow chart outlining a method according to the second aspect, and FIG. 7 schematically shows a computer program product in the form of a CD ROM disc comprising computer program code for carrying out the invention

FIGS. 4-6 are directed towards this second aspect of the present invention. FIG. 4 shows a block schematic of a terminal 18 communicating with the nodes of a network 10 that are similar to the nodes of FIG. 2. Here the first node is omitted; instead there is a fourth node 52 and a fifth node 54. The fourth node 52 comprises a fourth network radio interface 58 proving radio access RA3 according to a third communication technology (here GSM) and a fifth radio interface 60 providing radio communication according to the second communication technology. Both these interfaces are connected to a third local resource management unit 56. The fifth node 54 comprises a sixth network radio interface 64 proving radio access RA3 according to the third communication technology and a seventh network radio interface 66 providing radio communication according to the second communication technology RA2. In the network 10 there is no dedicated central radio resource management unit, instead the different local radio resource management units of the different nodes communicate with each other. One of the radio resource management units may however become a central radio resource management unit, as will be described in mode detail below.

The terminal 18 of FIG. 4 includes all of the elements of the terminal of FIG. 2. In addition to these there is a third terminal interface 68 providing radio communication with network interfaces using the third communication technology RA3. This third interface 68 is also connected to the terminal resource management unit 36. All of the network interfaces provide a cell for communicating with the terminal 18 and here the network interfaces in the same node provide cells that are co-located, i.e. one overlaps the other and they thus cover at least partly the same area in the same way as the first and second cells in FIG. 1. However it should be realized that also different nodes may provide overlapping cells.

FIG. 5 shows essentially the same nodes and units as FIG. 4. However in this figure the fourth and fifth nodes have been omitted.

Now the functioning of the invention according to this second aspect of the present invention will be described with reference being made to FIGS. 4, 5 and 6, where the latter shows a flow chart of some method steps carried out in a method according to this second aspect of the invention.

For a terminal there exists a candidate set of network access nodes, i.e. a set of access nodes through which the terminal may be connected to the network. As the terminal needs to have an access node and an access type selected, the number of controlling entities that the terminal 18 may be connected to is determined, where a controlling entity is typically a local resource management unit in a network node. For every terminal there is a neighbour set of controlling entities, i.e. radio resource management controlling units, each controlling a part of the candidate set of links for the terminal. Each such unit has at least partly knowledge of the whole candidate set of links by maintaining a neighbour list of controlling entities. This list may be determined through the terminal 18 signalling to the network 10 the network radio interfaces that it receives signals from. This information may then be sent to one or more of the interfaces. The information is then forwarded to one or more of the local resource management units 56, 62, 22 and 38. The controlling entities may agree upon a central control location alternative. The agreement is then based on communication between the controlling entities. It is furthermore possible that all or some of these entities may make up a distributed control location alternative. For each such alternative the efficiency of the alternative is evaluated. In order to evaluate this efficiency of the control location alternatives, a set of control location factors are first established, step 70. The set can include one or more control location factors. One such factor is the cell load, while another is the amount of signalling that is needed. The amount of signalling needed may here be estimated through counting the number of controlling entities. Another factor is the link quality, which may be the difference in link quality between nodes as in the first aspect of the present invention. In order to decide if a distributed or central control location alternative is to be selected, the different control location factors in the set are each compared with a corresponding control location criterion, step 72, where each criterion may be provided as a threshold. Each threshold may be fixed, but can also be dynamic, i.e. vary over time. For cell load the threshold may for instance be a certain load level and for link quality a certain difference in link quality between links, while for the signalling overhead estimate it might be a number of control entities. If the test is not passed, distributed access selection is provided, step 76. A distributed control location alternative means that the different local resource management units communicate with each other in order to jointly decide on the access node and interface for the contact between the terminal and the network. If however the test is passed for one or more of the factors, step 74, further investigations are made. For cell load a test may be passed, if the load in two or more cells are above said load threshold perhaps combined with if the difference in load between the two cells is small, for link quality the test may be passed if the difference in link quality is below a link quality threshold, while for the signalling estimate it might be that the number of controlling entities are above a number of entities threshold. The further investigations involve an investigation of if it is possible to refine any of the factors, step 78. If it is not, centralised access selection is performed, step 82. This means that the nodes select one node to act as a central radio resource management unit controlling the access selection. The one selected is typically the one for which the above mentioned efficiency is the highest. In FIG. 4, this is shown through the first local resource management unit 22 being the one that all other units are communicating with (shown with dashed arrows). This unit then decides where and how access to the terminal is to be given and in doing so requests or fetches relevant information from the other (local) resource management units.

If however it is possible to refine any of the factors, step 78, the factor(s) is/are refined, step 80, and a new test of control location factors with control location criteria is performed step 72. It is for instance possible that the number of controlling entities can be reduced. One reason why it might be possible to reduce the number is that the terminal requests a certain service that is only provided by some of the technologies, for instance by the first radio access technology RA1. In this case the fourth and the fifth nodes may be omitted, as is shown in FIG. 5, where the terminal has signalled the type of service wanted (shown with dashed lines). Thus now the number is reduced. If now the test is not passed, step 74, the local resource management units may perform distributed access selection, step 76, which is shown in FIG. 5 through the two local resource management units communicating with each other.

It should be realized that the second aspect is not limited to access selection, but can also be applied in other areas such as congestion control, admission control and other radio resource control and signalling.

The input for selecting one or more controlling entities may be based on one or more of the following criteria: mobility, energy consumption in the nodes as well as in the terminal, overhead and/or delay from radio resource management signalling between nodes, radio access measurements (link quality, signal-to-interference-plus-noise ratio (SINR), signal-to-interference ratio (SIR), receive signal strength indicator (RSSI), load etc.), rate of radio access measurements variation (link quality, signal-to-interference-plus-noise ratio (SINR), signal-to-interference ratio (SIR), receive signal strength indicator (RSSI), load etc.), radio resource management requirements on roundtrip, delay, bitrate message intensity etc., connectivity between nodes, load situation in network, available capacity in network, quality of service (QoS) requirement, traffic aspects (throughput, buffer levels etc.), business agreements, as well as end user and operator preferences. Adaptive distribution of control could also be applied to security, context transfer, media routing and mobility triggering.

The present invention has several advantages. The first aspect of the present invention allows reduction of the processing power in the network associated with selecting access node for a terminal. As such a selection for most terminals is straightforward, this reduction is significant. The access can for most terminals therefore also be faster. As a result the signalling in the network is reduced as is the delays involved with signalling, which also reduces the power consumption of the terminals as well as allows the network to concentrate on the cases where more factors are to be considered when determining access node. The invention may therefore also increase the quality of service for the end terminal. The second aspect of the present invention has the advantage of lowering signalling and delays within the network, as the most optimal node of the network is selected to perform access node selection. This thus also enhances the performance gain of the network.

Figure 7:
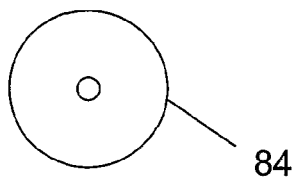

The radio resource management units according to the present invention can be implemented through one or more processors together with computer program code for performing the functions of the invention. The program code mentioned above may also be provided as a computer program product, for instance in the form of a data carrier carrying computer program code for performing the method according to the present invention when being loaded into the mobile station and/or a node. One such carrier 84, in the form of a CD ROM disc is generally outlined in FIG. 7. It is however feasible with other data carriers such as a memory stick. The computer program code can furthermore be provided as pure program code on a server and downloaded to the nodes or to the mobile.

While the invention has been described in connection with what is presently considered to be most practical and preferred embodiments, it is to be understood that the invention is not to be limited to the disclosed embodiments, but on the contrary, is intended to cover various modifications and equivalent arrangements. Therefore the present invention is only to be limited by the following claims.

The invention claimed is:

1. A method of access selection by a wireless communication network node for a terminal communicating with the network having one or more access nodes configured for providing access to the terminal according to one or more access technologies, the method comprising:
   determining whether at least one network parameter comprising cell load associated with the network and that is provided by a network node and that cannot be measured or determined by the terminal is required as input for access selection for the terminal;
   obtaining a network parameter comprising the cell load that cannot be measured or determined by the terminal if it is determined that the at least one network parameter is required as input for access selection for the terminal;
   selecting an access node for the terminal based at least in part on the network parameter each time the determination is made; and
   initiating or continuing terminal-based access selection if it is determined that no network parameter is required as input for the access selection.

2. The method of claim 1 further comprising selecting an access type together with the access node for the terminal based at least in part on the network parameter.

3. The method of claim 1 wherein determining whether the at least one network parameter is required as input for access selection for a terminal comprises periodically determining whether the at least one network parameter that is provided by a network node and cannot be measured or determined by the terminal is required as input for access selection for a terminal.

4. The method of claim 1 further comprising:
   receiving a request to perform the access node selection for the terminal based on the results of a test performed at the terminal, wherein the test compares a set of network conditions obtained by the terminal to at least one corresponding network condition criterion; and
   selecting the access node for the terminal responsive to the received request.

5. The method of claim 4 further comprising informing the terminal of the access node selection via the selected node to cause the terminal to:
   redefine one or more of the network condition criteria; and
   perform the test at the terminal using the redefined network condition criterion at least once.

6. The method of claim 1 wherein a single controlling network entity controls the selection of the access node for the terminal.

7. The method of claim 1 wherein a plurality of controlling network entities jointly control the selection of the access node for the terminal.

8. The method of claim 1 further comprising selecting an alternative control location where access node selection is to be performed from a set of available alternative control locations, wherein selecting an alternative control location comprises:

evaluating an efficiency of each alternative control location in the set of available alternative control locations; and selecting the alternative control location to perform the access selection for the terminal based at least in part on the evaluated efficiencies.

9. The method of claim 8 wherein the set of available alternative control locations comprises a centralized alternative control location and a distributed alternative control location, and wherein selecting the alternative control location comprises:

establishing a set of control location factors; and testing each control location factor in the set of control location factors with at least one corresponding control location factor criterion.

10. The method of claim 9 wherein selecting an alternative control location to perform the access selection from the set of available alternative control locations further comprises:

selecting the centralized alternative control location to perform the access selection if at least one control location factor in the set of control location factors passes the test; and selecting the distributed alternative control location to perform the access selection if none of the control location factors in the set of control location factors passes the test.

11. The method of claim 10 wherein selecting an alternative control location to perform the access selection further comprises:

determining whether the control location factor being tested may be refined if the control location factor passes the test;

selecting the centralized alternative control location to perform the access selection if the control location factor cannot be refined; and changing the control location factor and re-testing the set of available alternative control locations if the control location factor can be refined.

12. A method of aiding access selection by a wireless communication network node for a terminal communicating with the network having one or more access nodes configured for providing access to the terminal according to one or more access technologies, the method comprising:

determining whether at least one network parameter comprising cell load associated with the network and that is provided by a network node and that cannot be measured or determined by the terminal is required as input for access selection for a terminal;

obtaining a network parameter comprising the cell load that cannot be measured or determined by the terminal if it is determined that the at least one network parameter provided by a network node is required as input for access selection for a terminal;

generating a command to select an access node for the terminal based at least in part on the network parameter each time the determination is made; and initiating or continuing terminal-based access selection if it is determined that no network parameter is required as input for the access selection.

13. The method of claim 12 further comprising generating a command to select an access type together with the access node for the terminal based at least in part on the network parameter.

14. The method of claim 12 wherein determining whether the at least one network parameter is required as input for access selection for a terminal comprises periodically determining whether the at least one network parameter that is provided by a network node and cannot be measured or determined by the terminal is required as input for access selection for a terminal.

15. The method of claim 12 further comprising:

receiving a request to perform the access node selection for the terminal based on the results of a test performed at the terminal, wherein the test compares a set of network conditions obtained by the terminal to at least one corresponding network condition criterion; and selecting the access node responsive to the received request.

16. The method of claim 15 further comprising informing the terminal of the access node selection via the selected node to cause the terminal to:

redefine one or more of the network condition criteria; and perform the test at the terminal using the redefined network condition criterion at least once.

17. The method of claim 15 wherein at least one network condition is based on link quality between the terminal and at least one access node.

18. The method of claim 17 wherein the testing of a network condition comprises testing a link quality of a first link between a first access node and the terminal and a link quality of a second link between a second access node and the terminal.

19. A communication device in a wireless communication network for handling access selection for a terminal communicating with the network having one or more access nodes configured for providing access to the terminal based on one or more access technologies, the communication device comprising:

a resource management unit configured to:

obtain a network parameter comprising cell load associated with the network and that cannot be measured or determined by the terminal each time a determination is made that the at least one network parameter that is provided by a network node and that cannot be measured or determined by the terminal is required as input for access selection for the terminal;

select an access node for the terminal based at least in part on the network parameter each time the determination is made; and initiate or continue terminal-based access selection if it is determined that no network parameter is required as input for the access selection.

20. The device of claim 19 wherein the resource management unit is further configured to select an access type together with the access node for the terminal based at least in part on the network parameter.

21. The device of claim 19 wherein the resource management unit is further configured to re-determine whether the at least one network parameter that is provided by a network node and that cannot be measured or determined by the terminal is required as input for the access selection for the terminal.

22. The device of claim 19 wherein the resource management unit is further configured to:

receive a request to perform the access node selection for the terminal based on the results of a test performed at the terminal, wherein the test compares a set of network conditions obtained by the terminal to at least one corresponding network condition criterion; and select the access node for the terminal responsive to the received request.

23. The device of claim 22 wherein the resource management unit is further configured to informing the terminal of the access node selection via the selected node to cause the terminal to:
  redefine one or more of the network condition criteria; and
  perform the test at the terminal using the redefined network condition criterion at least once.

24. The device of claim 19 wherein the communication device comprises a network node entity.

25. The device of claim 24 wherein the network node entity is assisted by other controlling entities in the network when selecting the access node for the terminal.

26. A communication device in a wireless communication network for aiding access selection for a terminal communicating with the network having one or more access nodes configured for providing access to the terminal based on one or more access technologies, the device comprising:
  a resource management unit configured to:
    determine whether at least one network parameter comprising cell load associated with the network and that is provided by a network node and that cannot be measured or determined by the terminal is required as input for the access selection for the terminal;
    obtain a network parameter that cannot be measured or determined by the terminal if it is determined that the at least one network parameter provided by the network node is required as input for the access selection for the terminal;
    generate a command to select an access node for the terminal based at least in part on the network parameter each time the determination is made; and
    initiate or continue terminal-based access selection if it is determined that no network parameter is required as input for the access selection.

27. The device of claim 26 wherein the resource management unit is further configured to select an access type together with the access node for the terminal.

28. The device of claim 26 wherein the resource management unit is further configured to re-determine whether the at least one network parameter that is provided by a network node and that cannot be measured or determined by the terminal is required as input for the access selection for the terminal at least once.

29. The device of claim 26 wherein the resource management unit is configured to:
  receive a request to perform the access node selection for the terminal based on the results of a test performed at the terminal, wherein the test compares a set of network conditions obtained by the terminal to at least one corresponding network condition criterion; and
  select the access node for the terminal responsive to the received request.

30. The device of claim 29 wherein one or more of the network condition criteria have been redefined at least once.

31. The device of claim 29 wherein at least one of the network conditions is based on a link quality between the terminal and at least one access node.

32. The device of claim 31 wherein the testing of a network condition comprises testing a link quality of a first link between a first access node and the terminal, and a link quality of a second link between a second access node and the terminal.

33. A network node in a network having one or more access nodes configured for providing access to terminals according to one or more access technologies, the network comprising:
  a plurality of alternative control locations where access selection for a terminal communicating with the network is performed by determining whether at least one network parameter comprising cell load associated with the network and that is provided by a network node and that cannot be measured or determined by the terminal is required as input for an access selection for a terminal, obtaining the at least one network parameter that cannot be measured or determined by the terminal at least once, and selecting an access node for the terminal based at least in part on the network parameter if it is determined that the at least one network parameter is required as input;
  the network node comprising:
    a communication device of at least one of a radio resource management server provided in a radio network controller (RNC), and access nodes providing radio access to the network; and
    a resource management unit configured to:
  evaluate an efficiency of each alternative control location in a set of available alternative control locations; and
    select the alternative control location to perform an access selection for a terminal based at least in part on the evaluated efficiencies.

34. The network node of claim 33 wherein the set of available alternative control locations includes a centralized alternative control location and a distributed alternative control location, and wherein the resource management unit, when selecting an alternative control location, is further configured to:
  establish a set of control location factors; and
  test each control location factor in the set of control location factors with at least one corresponding control location factor criterion.

35. The network node of claim 34 wherein the resource management unit, when selecting an alternative control location, is further configured to:
  select the centralized alternative control location to perform the access selection for the terminal if at least one control location factor passes the test; and
  select the distributed alternative control location to perform the access selection for the terminal if none of the control location factors passes the test.

36. The network node of claim 35 wherein the resource management unit, when selecting an alternative control location, is further configured to:
  determine whether the control location factor being tested may be refined if the control location factor passes the test;
  select the centralized alternative control location to perform the access selection for the terminal if the control location factor cannot be refined; and
  refine the control location factor being tested and re-test the set of available alternative control locations if the control location factor can be refined.

37. A non-transient non-transitory computer readable medium for a communication device that performs access selection for a terminal communicating with a network having one or more access nodes configured for providing access to the terminal according to one or more access technologies, the computer readable medium having logic stored thereon configured to control the communication device to:
  obtain a network parameter comprising cell load associated with the network and that cannot be measured or determined by the terminal each time a determination is made that the at least one network parameter that is provided by a network node and that cannot be measured or determined by the terminal is required as input for access selection for the terminal;

select an access node for the terminal based at least in part on the network parameter each time the determination is made; and initiate or continue terminal-based access selection if it is determined that no network parameter is required as input for the access selection.

38. The computer readable medium of claim 37 wherein the logic stored thereon is further configured to control the communication device to select an access type together with the access node for the terminal based at least in part on the network parameter.

39. A non-transitory computer readable medium for a communication device that aids access selection for a terminal communicating with a network having one or more access nodes configured for providing access to the terminal according to one or more access technologies, the computer readable medium having logic stored thereon configured to control the communication device to:

determine whether at least one network parameter comprising cell load associated with the network and that is provided by a network node and that cannot be measured or determined by the terminal is required as input for the access selection for the terminal;

obtain the network parameter that cannot be measured or determined by the terminal;

generate a command to select an access node for the terminal based at least in part on the network parameter each time the determination is made; and initiate or continue terminal-based access selection if it is determined that no network parameter is required as input for the access selection.

40. The computer readable medium of claim 39 wherein the logic is further configured to control the communication device to select an access type together with the access node for the terminal based at least in part on the network parameter.

41. A non-transitory computer readable medium for a network node in a network having one or more access nodes configured for providing access to terminals according to one or more access technologies, and a plurality of alternative control locations where access selection for a terminal communicating with the network is performed by determining whether at least one network parameter comprising cell load associated with the network and that is provided by a network node and that cannot be measured or determined by the terminal is required as input for an access selection for a terminal, obtain the at least one network parameter that cannot be measured or determined by the terminal at least once, select an access node for the terminal based at least in part on the network parameter if it is determined that the at least one network parameter is required as input, wherein the computer readable medium comprises logic stored thereon configured to control the network node to:

evaluate an efficiency of each alternative control location for each alternative control location in a set of available alternative control locations; and select an alternative control location for the access selection for the terminal from the set of available control location alternatives based at least in part on the evaluated efficiencies.

42. The computer readable medium of claim 41 wherein the logic is further configured to control the network node to select an access type together with the access node for the terminal based at least in part on the network parameter.

* * * * *